United States Patent [19]

Fanning et al.

[11] Patent Number: 5,599,457

[45] Date of Patent: Feb. 4, 1997

[54] MACHINE COOLANT TREATMENT METHOD

[75] Inventors: Chris E. Fanning, Oklahoma City; Gary C. Garrett, Edmond, both of Okla.

[73] Assignee: Advanced Waste Reduction, Tulsa, Okla.

[21] Appl. No.: 230,677

[22] Filed: Apr. 21, 1994

Related U.S. Application Data

[63] Continuation-in-part of Ser. No. 117,265, Sep. 3, 1993, abandoned.

[51] Int. Cl.⁶ ................................................. B01D 15/00
[52] U.S. Cl. .................. 210/669; 210/688; 210/693; 210/776; 210/805; 210/806
[58] Field of Search .................................. 210/663, 669, 210/688, 693, 776, 799, 805, 806, 510.1

[56] References Cited

U.S. PATENT DOCUMENTS

| | | | |
|---|---|---|---|
| 2,297,817 | 10/1942 | Truxell et al. | 210/510.1 |
| 3,890,254 | 6/1975 | Guthrie | 260/2.5 BD |
| 4,434,054 | 2/1984 | Livesey et al. | 210/509 |
| 4,517,069 | 5/1985 | Harney | 204/290 F |
| 4,687,553 | 8/1987 | Solomon | 204/16 |
| 4,975,230 | 12/1990 | Pinkhasov | 264/59 |
| 5,104,529 | 4/1992 | Becker | 210/259 |
| 5,151,222 | 9/1992 | Ruffoni | 252/511 |
| 5,185,381 | 2/1993 | Ruffoni | 521/52 |

*Primary Examiner*—Ivars Cintins
*Attorney, Agent, or Firm*—Dunlap & Codding, P.C.

[57] ABSTRACT

A filtering apparatus and filtering method for removing free-oils, particulate matter and dissolved heavy metals from a machine coolant by withdrawing a portion of the machine coolant from a machine coolant reservoir through a skimmer assembly and thereafter passing the machine coolant through a filter assembly containing an oil absorbent, a particulate matter filter and a filter element having metal particles bound together in a porous metal sponge-like structure.

54 Claims, 3 Drawing Sheets

MACHINE COOLANT TREATMENT METHOD

RELATED APPLICATIONS

This application is a continuation-in-part of U.S. Ser. No. 08/117,265 filed Sep. 3, 1993 entitled: "FILTERING METHOD WHERE FLUID OR GAS IS PASSED THROUGH FILTER ELEMENT OF METAL PARTICLES INTERCONNECTED IN SPONGE-LIKE FORM", now abandoned.

FIELD OF THE INVENTION

The present invention relates generally to machine coolant systems and, more particularly, but not by way of limitation, to a method and apparatus for treating machine coolants to enhance the useful life of such coolants without the use of chemical additives.

DESCRIPTION OF THE PREFERRED EMBODIMENTS

The machining of metal parts has been practiced since the bronze age and machine coolant systems are nearly as archaic. Machine coolants are generically a simple oil/water emulsion. As metal parts are machined, the emulsion is sprayed on the parts and the machine tools as work is performed. The coolant, which washes metal cuttings off the part and carries heat from the tooling, is collected in a reservoir so that the coolant can be recycled to the machine tooling as needed.

Many times the machined part has a coating of oil on it which is carried away with the coolant. The oil washed off the part by the coolant is called "tramp oil"; and the metal cuttings washed away by the coolant are called "swarf". The presence of tramp oils in the coolant precipitates a chain of reactions that can quickly render the coolant unsuitable for further use. As the tramp oil rises to the top of the reservoir it spreads to cover the surface of the coolant. Anaerobic bacteria growth is rapidly promoted under the tramp oil layer. The pH of the coolant begins to drop as bacteria colony counts increase. As the coolant becomes more acidic, additional problems arise. Machine coolant that becomes acidic from bacterial growth tends to dissolve metallic ions from the parts machined. This allows toxic heavy metals to be present in the coolant, e.g., chromium, cadmium, lead, and nickel which not only provide health hazards for the machinists, but also effect tool life and parts finish.

Halogen based bactericides have heretofore been employed as an additive to machine coolants in an effort to combat bacterial growth. However, such bactericides are short lived and cannot be used in the machining of metals that are sensitive to hydrogen embrittlement such as titanium.

Figure 1:
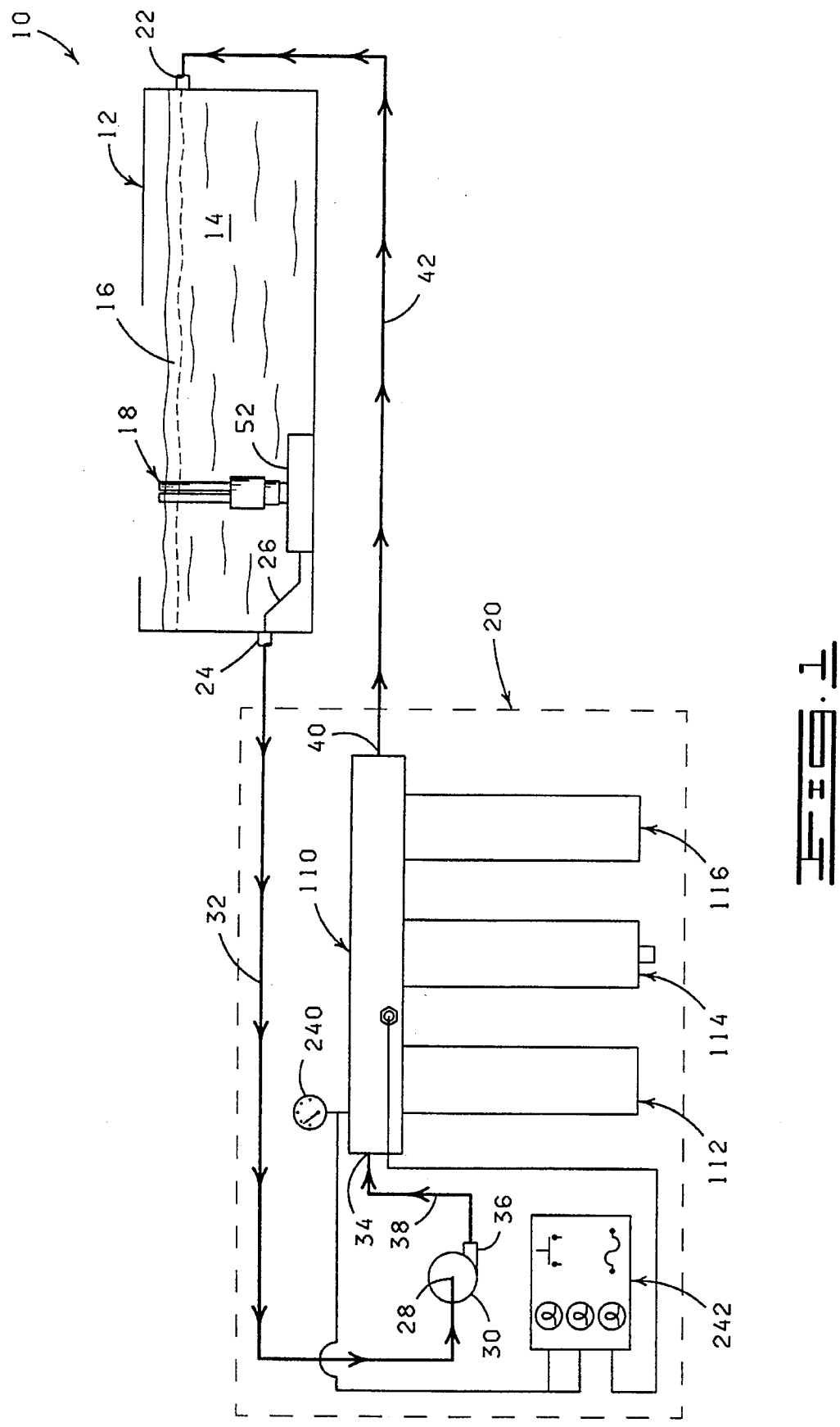
FIG. 1 is diagrammatic view of a machine coolant treatment system constructed in accordance with the present invention wherein tramp oil is skimmed from the surface of a machine coolant and passed through a filter system containing a plurality of filter elements to control bacterial growth and the pH of the coolant, while removing free oils, machine fines and dissolved heavy metals from the coolant.

Shown in FIG. 1 is a machine coolant treatment system 10 adapted to control bacterial growth and the pH of the coolant, while removing free oils, machine fines and dissolved heavy metals from the coolant. The system 10 includes a coolant reservoir 12 containing machine coolant 14. A portion of the machine coolant 14, which includes a layer of tramp oil 16 formed on the upper surface of the machine coolant 14, is removed from the reservoir 12 by a suction skimmer 18 and passed through a filter assembly 20 wherein free oil, machine fines and dissolved heavy metals are removed from the machine coolant 14. The resulting filtrate, i.e. the filtered machine coolant, in then recycled to the reservoir 12. As will be more fully described hereinafter, the design of the filter assembly 20 provides bacterial growth control in the machine coolant 14, as well as pH control of the machine coolant 14.

The reservoir 12 is provided with a fluid inlet 22 and a fluid outlet 24. The suction skimmer 18 is disposed within the reservoir 12 and connected to the fluid outlet 24 of the reservoir 12 by way of a conduit 26 so that fluid communication is established between the suction skimmer 18 and the fluid outlet 24 of the reservoir 12. The fluid outlet 24 of the reservoir 12 is also connected to a suction port 28 of a pump 30 by way of a conduit 32; and an inlet 34 of the filter assembly 20 is connected to a discharge port 36 of the pump 30 by way of a conduit 38. An outlet 40 of the filter assembly 20 is connected to the fluid inlet 22 of the reservoir 12 by way of a conduit 42. Thus, upon actuation of the pump 30, a portion of the machine coolant 14 (which includes the layers of tramp oil 16) is withdrawn from the reservoir 12 through the suction skimmer 18, passed through the filter assembly 20 and returned to the reservoir 12 as purified machine coolant.

As will be described in more detail hereinafter, the design and operation of the suction skimmer 18 permits the machine coolant 14 to be removed from the reservoir 12 under substantially laminar flow conditions while providing substantially vortical flow of the machine coolant through at least a portion of the suction skimmer 18.

Figure 2:
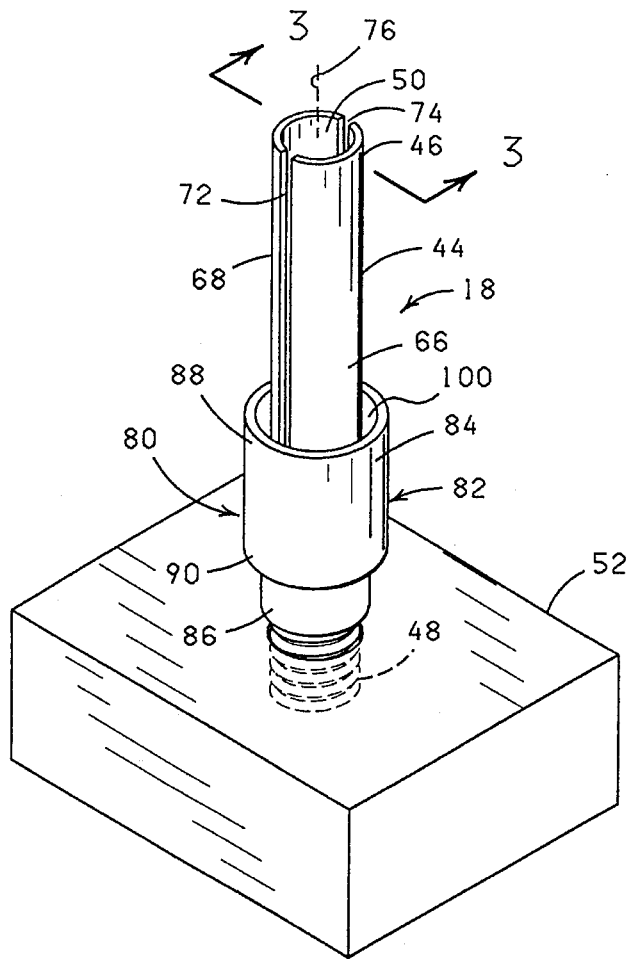
FIG. 2 is a perspective view of a suction skimmer for skimming tramp oil from the surface of the machine coolant.
Figure 3:
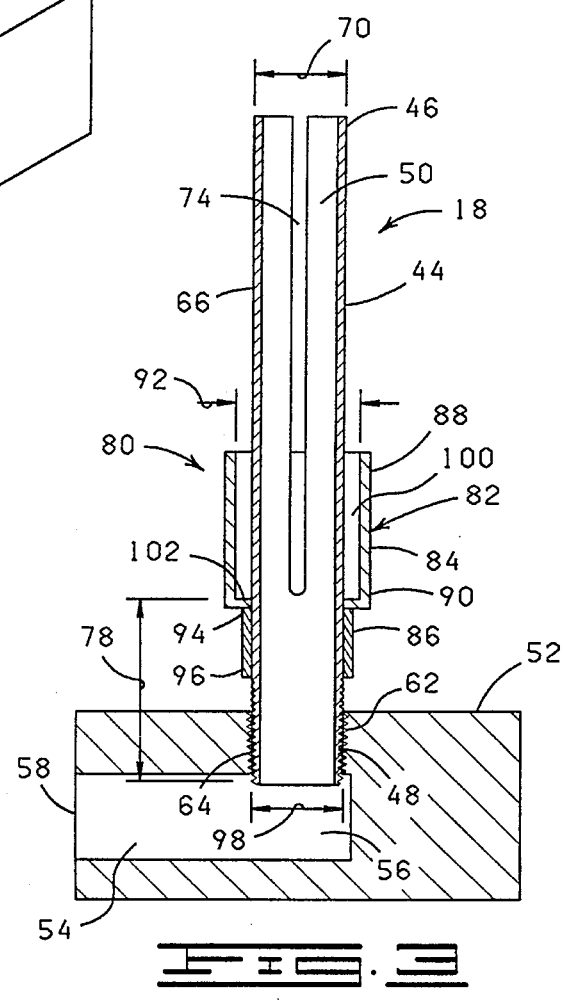
FIG. 3 is a cross sectional view of the suction skimmer of FIG. 2 taken along lines 3—3.

As more clearly shown in FIGS. 2 and 3, the suction skimmer 18 includes an elongated body member 44 having a first end 46, a second end 48 and a fluid flow passageway 50 extending therebetween. To stabilize the body member 44 in a substantially vertically disposed position so that the first end 46 of the body member 44 extends a distance above the machine coolant 14 in the reservoir 12 substantially as shown in FIG. 1, the suction skimmer 18 further includes a base member 52 having a fluid flow passageway 54 (FIG. 3) formed therein. One end 56 of the fluid flow passageway 54 formed in the base member 52 openly communicates with the fluid flow passageway 50 in the body member 44 and an oppositely disposed end 58 of the fluid flow passageway 54 of the base member 52 is adapted to connectably receive one end of the conduit 26 so that a fluid-tight connection is made therebetween and fluid communication is provided between the fluid flow passageway 50 of the body member 44 and the conduit 26.

The second end 48 of the body member 44 can be connected to the base member 52 in any conventional manner as long as a fluid-tight connection is formed between the second end 48 of the body member 44 and the base member 52, while maintaining fluid communication between the fluid flow passageway 50 of the body member 44 and the conduit 26. For example, the portion of the base member 52 defining the end 56 of the fluid flow passageway 50 in the base member 52 may be provided with internally disposed threads 62 which are adapted to matingly engage externally disposed threads 64 formed on the second end 48 of the body member 44.

The body member 44 is provided with a continuous sidewall 66 having an outer peripheral surface 68 and an outside diameter 70. A plurality of spatially disposed slots, such as slots 72 and 74, are formed through the continuous sidewall 66 of the body member 44 so as to openly communicate with the fluid flow passageway 50 of the body member 44. The slots 72 and 74, which are disposed substantially parallel to an elongated axis 76 of the body member 44, extend from the first end 46 of the body member 44 and terminate a distance 78 (FIG.3) from the second end 48 of the body member 44.

The suction skimmer 18 further includes a throttle assembly 80 supported on the body member 44 for varying the length of the slots 72 and 74 to regulate the flow of the machine coolant 14 therethrough and to insure that laminar flow of the machine coolant 14 is maintained as the machine coolant 14 is drawn into the fluid flow passageway 50 of the body member 44 through the slots 72 and 74. The throttle assembly 80 comprises a sleeve member 82 disposed about the peripheral surface 68 of the body member 44 and slidably movable thereon for varying the length of the slots 72 and 74 formed through the continuous sidewall 66 of the body member 44. The sleeve member 82 is provided with an upper sleeve portion 84 and a lower sleeve portion 86. The upper sleeve portion 84 of the sleeve member 82 has a first end 88, a second end 90 and an inside diameter 92; and the lower sleeve portion 86 of the sleeve member 82 has a first end 94, a second end 96 and an inside diameter 98. The inside diameter 92 of the upper sleeve portion 84 of the sleeve member 82 is greater than the outside diameter 70 of the body member 44 so that an annulus 100 is formed between the upper sleeve portion 84 and an adjacently disposed portion of the body member 44; whereas, the inside diameter 98 of the lower sleeve portion 86 substantially corresponds to the outside diameter 70 of the body member 44 so that the lower sleeve portion 86 can be fictionally supported on the body member 44.

The first end 94 of the lower sleeve portion 86 is connected to the second end 90 of the upper sleeve portion 84 so as to define a closed lower end 102 of the annulus 100. The lower sleeve portion 86 is disposed about the outer peripheral surface 68 of the body member 44 and frictionally engages the body member 44 so that the sleeve member 82 can be disposed in a desired position on the body member 44 while permitting the sleeve member 82 to be slidably moved along the body member 44 to vary the length of the slots 72 and 74.

Figure 4:
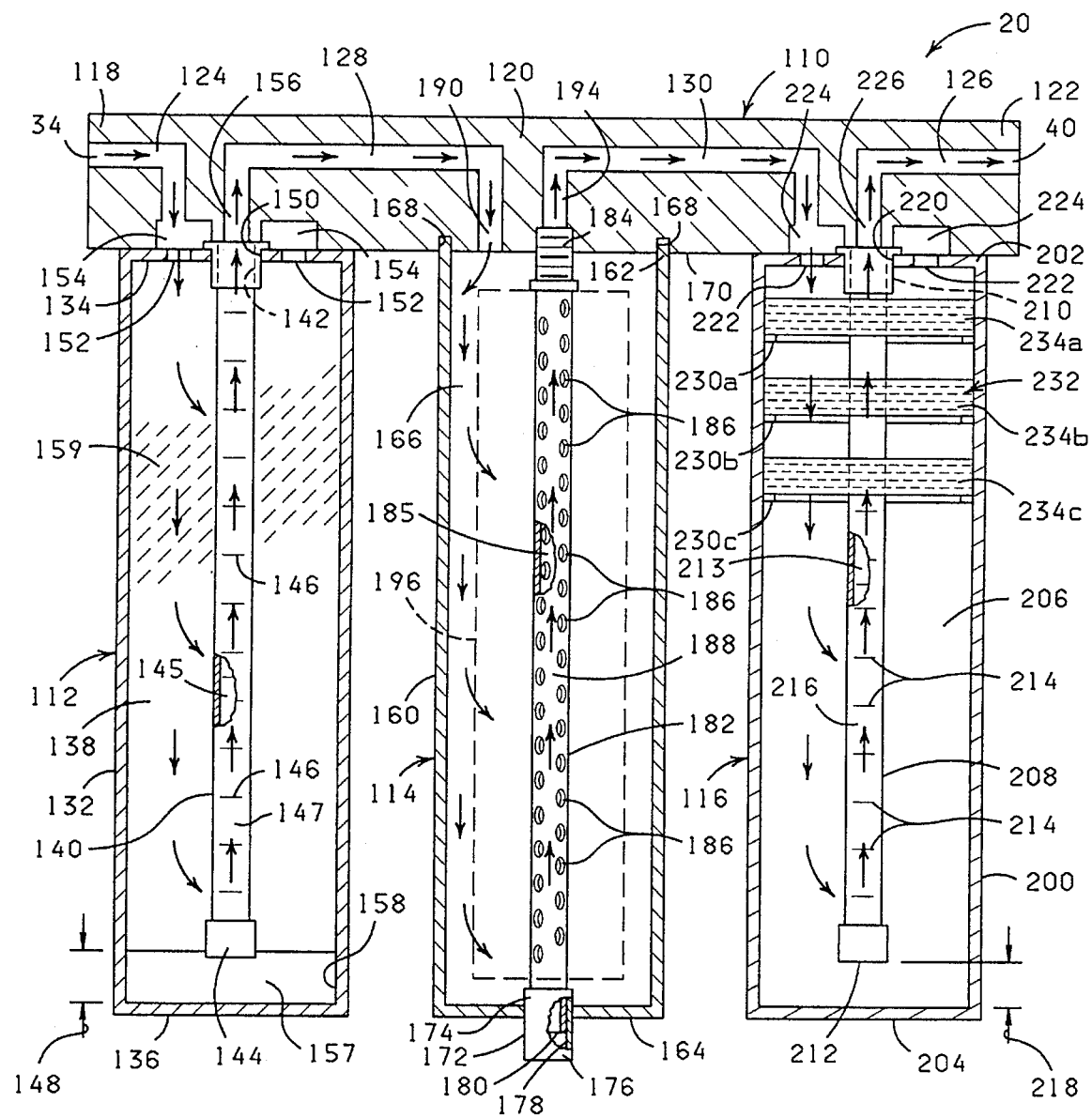
FIG. 4 is a cross sectional view of the filter system of the machine coolant treatment system of FIG. 1.

As more clearly shown in FIG. 4, the filter assembly 20 includes a manifold 110, an oil absorbent filter 112, a particle filter 114 and a heavy metals filter 116. The manifold 110 is provided with a first end portion 118, a medial portion 120 and a second end portion 122. The first end portion 118 of the manifold 110 is provided with a fluid flow passageway 124 defining the inlet 34 of the filter assembly 20; and the second end portion 122 of the manifold 110 is provided with an fluid flow passageway 126 defining the outlet 40 of the filter assembly 20. The medial portion 120 of the manifold 110 is provided with fluid flow passageways 128 and 130 so that fluid communication is established between the oil absorbent filter 122, the particle filter 114 and the heavy metals filter 116 in a manner which will be described in detail hereinafter.

The oil absorbent filter 112, which removes free tramp oils from the machine coolant 14, includes a filter case 132. The filter case 132 preferably is constructed of a plastic material or a metal with a plastic lining. In one form, the filter case 132 is a cylindrically shaped member having a closed upper end 134, a closed lower end 136 and an absorbent media chamber 138 extending therebetween.

The oil absorbent filter 112 further includes a tube 140 having a first end 142, a second end 144, a fluid flow passageway 140 extending therebetween, and a plurality of spatially disposed slits 146 extend through a sidewall 147 of the tube 140 to provide fluid communication between the absorbent media chamber 138 of the filter case 132 and the fluid flow passageway 145 of the tube 140.

The first end 142 of the tube 140 is connected to the upper end 134 of the filter case 132 and the second end 144 of the tube 140 terminates a distance 148 from the lower end 136 of the filter case 132 substantially as shown.

The upper end 134 of the filter case 132 is provided with a substantially centrally disposed outlet port 150 and a fluid inlet port 152 circumferentially disposed about the outlet port 150 substantially as shown. The upper end 134 of the filter case 132 is connected to the manifold 110 so that a downstream end portion 154 of the fluid flow passageway 124 is in fluid communication with the absorbent media chamber 138 of the filter case 132 by way of the fluid inlet port 152 and an upstream end portion 156 of the fluid flow passageway 128 of the manifold 110 is in fluid communication with the fluid flow passageway 145 of the tube 140 by way of the outlet port 150.

The upper end 134 of the filter case 132 can be connected to the manifold 110 in any conventional manner so long as a fluid-tight seal is formed therebetween and fluid communication is provided between the fluid flow passageway 124 of the manifold 110 and the absorbent media chamber 138 of the filter case 132 and between the fluid flow passageway 145 of the tube 140 of the filter case 132 and the fluid flow passageway 128 of the manifold 110. For example, the upper end 134 of the filter case 132 can be provided with an threaded male portion (not shown) which matingly engages a threaded female portion (also not shown) formed in the manifold 110 so as to provide a fluid-tight seal therebetween while providing fluid communication between the fluid flow passageway 124 of the manifold 110 and the absorbent media chamber 138 of the filter case 132 and between the fluid flow passageway 145 of the tube 140 of the oil absorbent filter 112 and the fluid flow passageway 128 of the manifold 110.

A foam spacer 157 is positioned in a lower end portion 158 of the absorbent media chamber 138 and the remainder of the absorbent media chamber 138 is packed with an oil absorbent media 159. Any suitable oil absorbent media capable of absorbing the free oil (i.e. tramp oil) from the machine coolant 14 being processed can be employed. For example, desirable results have been obtained wherein the oil absorbent media 159 is a mixture of two absorbents, namely, a mixture of a block polymer which is capable of locking up the free oils and a cellulose oil absorbent adapted to absorb the free oils at a faster rate than the block polymer.

The cellulose oil absorbent may be formulated from any suitable cellulose material, such as scrap or waste paper; and the block polymer may be any block polymer capable of locking up free oil, such as the commercially available oil absorbent block polymer marketed by Petroleum Environmental Technologies, Inc. of Williamsburg, Mich.

The particle filter 114 which removes particulate matter (i.e. swarf) from the substantially tramp oil-free machine coolant, is positioned downstream of the oil absorbent filter 112. The particle filter 114 includes a filter case 160. The filter case 160 preferably is constructed of a plastic material or a metal with a plastic lining. In one form, the filter case 160 is a cylindrically shaped member having an open upper end 162, a closed lower end 164 and a filter cartridge chamber 166 extending therebetween.

The upper end 162 of the filter case 160 is disposed in a recess 168 formed in a lower side 170 of the manifold 110 so that the filter case 160 can be connected to the manifold 110 to provide a fluid-tight connection therebetween while providing fluid communication between the filter cartridge chamber 166 of the filter case 160 and the fluid flow passageways 128 and 130 in a manner hereinafter described in detail.

The closed lower end 164 of the filter case 160 is provided with a centrally disposed hub 172 having a first end portion 174 disposed within the cavity 166 and a second end portion 176 extending in an outwardly direction from the lower end 164 of the filter case 160 substantially as shown. The hub 172 defines a cavity 178 adapted to receive a lower end 180 of a filter cartridge stabilizing tube 182 so that the filter cartridge stabilizing tube 182 can be connected to the filter case 160 by way of the hub 172.

The filter cartridge stabilizing tube 182 is concentrically disposed within the filter cartridge chamber 166 of the filter case 160; and the filter cartridge stabilizing tube 182 has a length greater than the length of the filter case 160.

The filter cartridge stabilizing tube 182 is further characterized as having a threaded upper end portion 184, a fluid flow passageway 185 extending between the lower and upper ends 180, 184 and a plurality of spatially disposed apertures 186 formed through a sidewall 188 of the filter cartridge stabilizing tube 182 so as to provide fluid communication between the filter cartridge chamber 166 and the fluid flow passageway 185 of the filter cartridge stabilizing tube 182. The threaded upper end portion 184 of the filter cartridge stabilizing tube 182 is threadably connectable to the manifold 110 so that in a assembled position, the upper end 162 of the filter case 160 is disposed within the recess 168 formed in the lower side 170 of the manifold 110 and a fluid-tight connection is made between the manifold 110 and the filter case 160. If required, a gasket such as an O-ring (not shown) can be positioned within the recess 168 to insure the formation of a fluid-tight seal between the manifold 110 and the filter case 160. Thus, when the filter case 160 is connected to the manifold 110, a downstream end portion 190 of the fluid flow passageway 128 of the manifold 110 is in fluid communication with the filter cartridge chamber 166 of the filter case 160 and an upstream end portion 194 of the fluid flow passageway 130 of the manifold 110 is in fluid communication with the fluid flow passageway 185 of the filter cartridge stabilizer tube 182 substantially as shown.

The particle filter 114 further includes a filter cartridge 196 (shown by phantom lines in FIG. 4). The filter cartridge 114 has a central passageway (not shown) extending therethrough so that the filter cartridge stabilizer tube 182 can be positioned therethrough to support and stabilize the filter cartridge 196 in the filter cartridge chamber 166 of the filter case 160 substantially as shown.

Any commercially available filter cartridge capable of filtering particulate matter from the substantially tramp oil-free machine coolant and which can be positioned on the filter cartridge stabilizer tube 182 so as to be supported within the filter cartridge chamber 166 of the filter case 160 can be employed as the filter cartridge 196. Desirably, the filter cartridge will have a pore size of from about 0.5 to about 40 microns. An example of a commercially available filter which can be employed as the filter cartridge 196 is a polypropylene particle filter having a pore size of about 5 microns manufactured by Mattson, Inc. of Barrington, Ill.

The heavy metals filter 116, which is positioned downstream of the particle filter 114, includes a filter case 200. The filter case 200 preferably is constructed of a plastic material or a metal with a plastic lining. In one form, the filter case 200 is a cylindrically shaped member having a closed upper end 202, a closed lower end 204 and a filter chamber 206 extending therebetween.

The heavy metals filter 116 further includes a tube 208 having an open first end 210, a closed second end 212 and a fluid flow passageway 213 extending therebetween. A plurality of spatially disposed slits 214 extend through a sidewall 216 of the tube 208, so as to provide fluid communication between the filter chamber 206 of the filter case 200 and the fluid flow passageway 213 of the tube 208.

The first end 210 of the tube 208 is connected to the upper end 202 of the filter case 200 and the second end 212 of the tube 208 terminates a distance 218 from the lower end 204 of the filter case 200.

The upper end 202 of the filter case 200 is provided with a substantially centrally disposed outlet port 220 and a fluid inlet port 222 circumferentially disposed about the outlet port 220 substantially as shown. The upper end 202 of the filter case 200 is connected to the manifold 110 so that a downstream end portion 224 of the fluid flow passageway 130 of the manifold 110 is in fluid communication with the filter chamber 206 of the filter case 200 by way of the fluid inlet port 222, and an upstream end portion 226 of the fluid flow passageway 126 of the manifold 110 is in fluid communication with the fluid flow passageway 213 of the tube 208 by way of the outlet port 220.

The upper end 202 of the filter case 200 can be connected to the manifold 110 in any conventional manner so long as a fluid-tight seal is formed therebetween and fluid communication is provided between the fluid flow passageway 130 of the manifold 110 and the filter chamber 206 of the filter case 200, and between the fluid flow passageway 213 of the tube 208 of the filter case 200 and the fluid flow passageway 126 of the manifold 110. For example, the upper end 202 of the filter case 200 can be provided with a threaded male portion (not shown) which matingly engages a threaded female portion (also not shown) formed in the manifold 110 so as to provide a fluid-tight seal therebetween while providing fluid communication between the fluid flow passageway 130 of the manifold 110 and between the filter chamber 206 of the filter case 200 and the fluid flow passageway 213 of the tube 208 of the filter case 200 and the fluid flow passageway 126 of the manifold 110.

A plurality of spatially disposed ring like supports 230 are secured to the filter case 200 and disposed in the filter chamber 206. Three supports 230 are shown in the drawing and designated therein by the individual reference numerals 230a, 230b and 230c.

A filter 232 includes a plurality of filter elements 234. Each of the filter elements 234 is disposed on one of the supports 230. Each of the supports 230 cooperates to support one of the filter elements 234 within the filter chamber 206 at a predetermined position. Three filter elements 234 are shown in the drawing and designated by the individual reference numerals 234a, 234b and 234c, respectively. More particularly, the filter element 234a is supported on the support 230a, the filter element 234b is supported on the support 230b and the filter element 234c is supported on the support 230c.

The number of filter elements 234 and cooperating supports 230 in the filter chamber 206 of the filter case 200 can vary and will generally depend upon the amount of heavy metals and other contaminants in the machine coolant to be treated, the degree with which such heavy metals and other contaminants are to be removed from the machine coolant and the treatment rate (i.e. the desired rate of flow of the machine coolant through the filter elements 234), and the degree of pH control and bacterial growth control desired in the machine coolant.

The filter elements 234 each are identical in construction and operation although it should be noted that the design parameters of each filter element 234 may vary if desired.

Each filter element 234 comprises metal particles bound together in an interconnected form of a porous metal, sponge-like structure. The metal particles are selected from a group of particles comprising zinc and copper, or zinc, or copper, or combinations thereof. The metal particles preferably are of the type described in U.S. Pat. No. 5,135,654, titled "Method For Treating Fluids" issued to Heskett, Aug. 4, 1992, and U.S. Pat. No. 4,642,192 titled "Method Of Treating Fluids" issued to Heskett, Feb. 10, 1987, and U.S. Pat. No. 5,122,274, titled "Method of Treating Fluids" issued to Heskett, Jun. 16, 1992 and the disclosure of each of these three patents specifically hereby are incorporated herein by reference.

The metal particles described before are commercially available from Fluid Treatment, Inc. of Constantine, Mich. and sold under their mark KDF. More particularly, particles sold by this company and. identified by the mark KDF-55 have been found useful in forming the filter elements 234 of the heavy metals filter 116.

The commercially available metal particles described before are in a powder like form. To form the sponge-like structure contemplated by the present invention, the particles are mixed with a carrier and applied to a foam structure. The foam structure then is subjected to heat and pressure to form the sponge-like structure. The method for forming sponge-like structures of metal or ceramics is well known in the art and commercially available through companies such as Astromet, Inc. of Cincinnati, Ohio.

The various parameters of the sponge-like filter elements 234 such as pore size and density may vary widely. Preferably, the pore size of the filter elements 234 is in a range from about 10 microns to about ¼ of an inch.

As shown in FIG. 1, the machine coolant treatment system 10 further includes a pressure gauge 240 and an indicator circuit 242 capable of visually alerting an operator to filter and flow conditions of the filter assembly 20. That is, the pressure gauge 240, which is connected to the manifold 110 through a pressure port (not shown), enables an operator to visually monitor the overall system pressure; whereas, the indicator circuit, which consists of micro switches and LED's and is connected to the manifold 110 through a pressure port (also not shown) downstream of the oil absorbent filter 112 and upstream of the particle filter 114, provides visual signals indicative of when the particle filter 114 and the heavy metals filter 116 reach change out pressure, as well as a loss of flow through the particle and heavy metals filters 114 and 116 filters and thus the manifold 110.

In order to remove tramp oil, particulate matter and heavy metals from the machine coolant 14, as well as to control bacterial growth and pH of the machine coolant 14, the pump 30 is actuated so that machine coolant 14, including the upper layer 16 of tramp oil, is drawn through the slot 72 and 74 of the suction skimmer 18 under substantially laminar flow conditions. Once inside fluid flow passageway 50 of the suction skimmer 18 the machine coolant 14 forms a stretched whirlpool vortex so that the machine coolant 14 is gently fed to the pump 30. The machine coolant 14 is then pumped to the manifold 110 and through the oil absorbent filter 112 to produce a first filtrate substantially free of free oils. the oil absorbent filter 112 contains the oil absorbent media 159 which desirably consists of two oil absorbents. One oil absorbent is a block polymer which physically locks up free oils and the other is a cellulose based absorbent which absorbs free oils faster than the polymer.

The first filtrate (i.e., the filtrate from the oil absorbent filter 112) is then fed to the particle filter 114 which contains a replaceable particle filter having a pore size of from about 0.5 to about 40 microns. Passage of the first filtrate from the oil absorbent filter 112 through the particle filter produces a second filtrate which is substantially free of metal fines and grit.

The second filtrate (i.e., the filtrate from the particle filter 114) is then fed through the heavy metals filter 116 which contains filter elements of metal particles bound together in an interconnected form of a porous metal, sponge-like structure to provide a third or resulting filtrate substantially free of dissolved heavy metals; that is, dissolved heavy metals present in the second filtrate from the particle filter 114 are removed therefrom by the heavy metals filter 116, and the heavy metals filter 116 controls the pH and bacterial growth of the machine coolant being processed by the machine coolant treatment system 10 so that the treated machine coolant can be recycled to the coolant reservoir 12.

The treated machine coolant promotes increased tool life and improved surface finish on parts. Further, employee health concerns are reduced since bacteria laden machine coolant is not sprayed and atomized in workers' areas.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for treating a machine coolant containing tramp oil, particulate matter and dissolved heavy metals comprising:

passing the machine coolant through an oil absorbent filter to produce a first filtrate substantially free of tramp oil;

passing the first filtrate through a particle filter to produce a second filtrate substantially free of particulate matter; and passing the second filtrate through at least one porous metal sponge-like structure formed of metal particles bound together in an interconnected form to produce a treated machine coolant substantially free of tramp oil, particulate matter and dissolved heavy metals wherein the pH and bacterial growth in the treated machine coolant are controlled without the addition of bactericides or pH control agents to the treated machine coolant by passage of the machine coolant through the porous metal sponge-like structure.

2. A method for treating a machine coolant containing tramp oil, particulate matter and dissolved heavy metals to produce a treated machine coolant having a controlled pH and which is substantially free of bacteria and algae without the addition of chemical additives, the method comprising:

passing the machine coolant through an oil absorbent filter containing an oil absorbent media capable of absorbing the tramp oil to provide a first filtrate substantially free of tramp oil;

passing the first filtrate through a particle filter having a pore size of from about 0.5 to about 40 microns to provide a second filtrate; and passing the second filtrate through a plurality of porous metal sponge-like structures wherein each porous sponge-like structure is formed of metal particles bound together in an interconnected form to provide a treated machine coolant having a controlled pH which is resistant to bacterial growth and which is substantially free of tramp oil, particulate matter and dissolved heavy metals.

3. The method of claim 2 wherein the oil absorbent media is a block polymer capable of locking up free oil and a cellulose absorbent.

4. The method of claim 3 wherein the particle filter is a polypropylene particle filter.

5. The method of claim 4 wherein the polypropylene particle filter has an average pore size of about 5 microns.

6. The method of claim 2 wherein the particle filter is a polypropylene particle filter.

7. The method of claim 6 wherein the polypropylene particle filter has an average pore size of about 5 microns.

8. A method for treating a machine coolant containing tramp oil, particulate matter and dissolved heavy metals to provide a treated machine coolant having an extended useful life, the method comprising:

providing an oil absorbent filter containing an oil absorbent media capable of absorbing the tramp oil in the machine coolant;

passing the machine coolant through the oil absorbent filter to produce a first filtrate substantially free of tramp oil;

providing a particle filter capable of removing particulate matter from the machine coolant;

passing the first filtrate through the particle filter to produce a second filtrate substantially free of particulate matter;

providing a porous metal sponge-like structure formed of metal particles bound together in an interconnected form; and passing the second filtrate through the porous metal sponge-like structure to provide a treated machine coolant substantially free of tramp oil, particulate matter and dissolved heavy metals having a controlled pH and which is resistant to bacterial growth without the addition of chemical additives to the treated machine coolant.

9. The method of claim 8 wherein in the step of providing the oil absorbent filter the oil absorbent media is a block polymer capable of locking up free oil and a cellulose absorbent.

10. The method of claim 9 wherein in the step of providing the particle filter the particle filter is a polypropylene particle filter.

11. The method of claim 9 wherein in the step of providing the particle filter the particle filter is a polypropylene particle filter having an average pore size of about 5 microns.

12. The method of claim 8 wherein in the step of providing the particle filter the particle filter is a polypropylene particle filter.

13. The method of claim 8 wherein in the step of providing the particle filter the particle filter is a polypropylene particle filter having an average pore size of about 5 microns.

14. A method for treating a machine coolant of a reservoir so as to enhance the useful life of the machine coolant and tools wherein the machine coolant contains tramp oil, particulate matter and dissolved heavy metals, the method comprising:

withdrawing coolant from the reservoir;

passing the withdrawn coolant through a pump so as to provide a pressurized stream of coolant;

passing the pressurized stream of coolant through an oil absorbent filter containing an oil absorbent media to produce a first filtrate substantially free of tramp oil;

passing the first filtrate through a particle filter to produce a second filtrate substantially free of particulate matter;

passing the second filtrate through at least one porous metal sponge-like structure formed of metal particles consisting essentially of a mixture of zinc and copper to provide a treated machine coolant substantially free of tramp oil, particulate matter and dissolved heavy metals and thereby provide a substantially contaminant-free treated machine coolant having a controlled pH and which is resistant to bacterial growth without addition of chemical additives to the treated machine coolant; and recycling the treated machine coolant to the reservoir.

15. The method of claim 14 wherein the oil absorbent media is a block polymer capable of locking up free oil and a cellulose absorbent.

16. The method of claim 15 wherein the particle filter is a polypropylene particle filter.

17. The method of claim 16 wherein the polypropylene particle filter has an average pore size of about 5 microns.

18. The method of claim 14 wherein the particle filter is a polypropylene particle filter.

19. The method of claim 18 wherein the polypropylene particle filter has an average pore size of about 5 microns.

20. A method for treating a machine coolant of a reservoir so as to enhance the useful life of the machine coolant and tools wherein the machine coolant contains tramp oil, particulate matter and dissolved heavy metals, the method comprising:

providing a suction skimmer in the reservoir for removing coolant containing tramp oil from the reservoir;

pressurizing the coolant removed from the reservoir to a predetermined pressure;

providing an oil absorbent filter containing an oil absorbent media capable of absorbing the tramp oil in the coolant;

passing the coolant through the oil absorbent filter to produce a first filtrate substantially free of tramp oil;

providing a particle filter capable of removing particulate matter from the first filtrate;

passing the first filtrate through the particle filter to produce a second filtrate substantially free of particulate matter;

providing at least one porous metal sponge-like structure formed of metal particles bound together in an interconnected form;

passing the second filtrate through the porous metal sponge-like structure to provide a treated coolant substantially free of tramp oil, particulate matter and dissolved heavy metals and which has a controlled pH and which is resistant to bacterial growth; and introducing the treated coolant into the coolant reservoir.

21. The method of claim 20 wherein in the step of providing the oil absorbent filter the oil absorbent media is a block polymer capable of locking up free oil and a cellulose absorbent.

22. The method of claim 21 wherein in the step of providing the particle filter the particle filter is a polypropylene particle filter.

23. The method of claim 22 wherein in the step of providing the particle filter the particle filter is a polypropylene particle filter having an average pore size of about 5 microns.

24. The method of claim 20 wherein in the step of providing the particle filter the particle filter is a polypropylene particle filter.

25. The method of claim 20 wherein in the step of providing the particle filter the particle filter is a polypropylene particle filter having an average pore size of about 5 microns.

26. A method for treating a machine coolant of a reservoir so as to enhance the useful life of the machine coolant and tools wherein the reservoir is provided with an outlet and the machine coolant contains tramp oil, particulate matter and dissolved heavy metals, the method comprising:

providing a suction skimmer in the reservoir for removing coolant containing tramp oil from the reservoir via the outlet of the reservoir wherein the suction skimmer comprises:

a body member having a first end, a second end, a fluid flow passageway extending through at least a portion of the body member and openly communicating with the second end of the body member and at least one slot extending along a portion of the body member and openly communicating with the fluid flow passageway, the second end of the body member connectable to the outlet of the reservoir so that fluid entering the fluid flow passageway of the body member via the slot is discharged from the reservoir via the outlet thereof;

pressurizing the coolant removed from the reservoir to a predetermined pressure;

providing an oil absorbent filter containing an oil absorbent media capable of absorbing the tramp oil in the coolant;

passing the coolant through the oil absorbent filter to produce a first filtrate substantially free of tramp oil;

providing a particle filter capable of removing particulate matter from the first filtrate;

passing the first filtrate through the particle filter to produce a second filtrate substantially free of particulate matter;

providing a heavy metals filter having at least one filter element comprising metal particles bound together in an interconnected form of a porous metal sponge-like structure;

passing the second filtrate through the heavy metals filter to provide a treated coolant substantially free of tramp oil, particulate matter and dissolved heavy metals and having a controlled pH which is resistant to bacterial growth; and introducing the treated coolant into the coolant reservoir.

27. The method of claim 26 wherein, in the step of providing the suction skimmer, the suction skimmer further comprises:

throttle means supported by the body member for varying the length of the slot so as to provide substantially laminar flow of the coolant containing tramp oil through the slot and into the fluid flow passageway of the body member.

28. The method of claim 27 wherein, in the step of providing the suction skimmer, the throttle means comprises:

a sleeve member disposed on the body member so as to be slidably movable thereon for varying the length of the slot.

29. The method of claim 27 wherein, in the step of providing the suction skimmer, the body member is an elongated body member having a peripheral surface and wherein the throttle means comprises;

a sleeve member disposed about the peripheral surface of the elongated member the body member so as to be slidably movable thereon for varying the length of the slot, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slot in the elongated body member.

30. The method of claim 26 wherein, in the step of providing the suction skimmer, the body member is an elongated body member having a plurality of spatially disposed elongated slots extending from the first end of the elongated body member and terminating a distance from the second end thereof, and wherein the elongated body member further comprises means for connecting the second end of the elongated body member to the outlet of the reservoir so that a fluid-tight connection is formed therebetween and the first end of the elongated body member and a portion of the slots are disposed a distance above the machine coolant in the reservoir.

31. The method of claim 30 wherein, in the step of providing the suction skimmer, the suction skimmer further comprises:

throttle means supported by the elongated body member for varying the length of the slots and thereby maintaining substantially laminar flow of the coolant containing tramp oil into the fluid flow passageway of the body member.

32. The method of claim 31 wherein, in the step of providing the suction skimmer, the throttle means comprises:

a sleeve member disposed on the elongated body member so as to be slidably movable thereon for varying the length of the slots.

33. The method of claim 31 wherein, in the step of providing the suction skimmer, the elongated body member is provided with a substantially circular shaped cross section and has a peripheral surface and wherein the throttle means comprises;

a sleeve member disposed about the peripheral surface of the elongated body member so as to be slidably movable thereon for varying the length of the slots, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slots in the elongated body member.

34. The method of claim 26 wherein, in the step of providing the suction skimmer, the body member is a cylindrically shaped elongated body member having an elongated axis extending from the first end to the second end and an outer peripheral surface, and wherein a plurality of the slots are spatially disposed in the body member, each of the slots being disposed substantially parallel to the elongated axis of the cylindrically shaped elongated member and extending from the first end of the body member and terminating a distance from the second end thereof, and wherein the suction skimmer further comprises:

throttle means supported by the cylindrically shaped elongated body member for varying the length of the slots and thereby controlling the flow rate of the machine coolant through the fluid flow passageway of the cylindrically shaped elongated body member so as to provide substantially laminar flow of the machine coolant through the slots and into the fluid flow passageway.

35. The method of claim 34 wherein, in the step of providing the suction skimmer, the throttle means comprises:

a sleeve member disposed on the peripheral surface of the cylindrical shaped elongated body member so as to be slidably movable thereon for varying the length of the slots.

36. The method of claim 35 wherein, in the step of providing the suction skimmer, the sleeve member is provided with an upper sleeve portion and a lower sleeve portion, the upper sleeve portion having a first end and a second end, the upper sleeve portion disposed a distance from the peripheral surface of the cylindrically shaped elongated body member so that the upper sleeve portion cooperates with an adjacently disposed portion of the peripheral surface of the cylindrically shaped elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the cylindrically shaped elongated body member and frictionally engaging the cylindrically shaped elongated body member so that the sleeve member can be disposed in a desired position on the cylindrically shaped elongated body member while permitting the sleeve member to be slidably moved along the peripheral surface of the cylindrically shaped elongated body member to vary the length of the slots in the cylindrically shaped elongated body member.

37. A method for separating a tramp oil, swarf and dissolved heavy metals from a machine coolant withdrawn from a reservoir wherein the reservoir is provided with a fluid outlet, comprising:

providing a suction skimmer comprising a body member having a first end, a second end, a fluid flow passageway extending through at least a portion of the body member and openly communicating with the second end of the body member, and at least one slot formed in the body member and extending a selected distance from the first end toward the second end such that the slot openly communicates with the fluid flow passageway, the slot having an upper portion and a lower portion;

connecting the second end of the body member to the outlet of the reservoir such that the fluid flow passageway of the body member is in fluid communication with the outlet of the reservoir and the first end of the body member and the upper portion of the slot formed therein are disposed a distance above the coolant in the reservoir and the lower portion of the slot is disposed within the coolant in the reservoir;

withdrawing coolant from the reservoir by passing coolant through the slot of the body member under laminar flow conditions for passage through the fluid flow passageway of the body member and the outlet of the reservoir;

passing the machine coolant through an oil absorbent filter containing an oil absorbent media capable of absorbing the tramp oil in the machine coolant and thereby provide a first filtrate;

passing the first filtrate through a particle filter having a pore size of from about 0.5 to about 40 microns and thereby provide a second filtrate; and passing the second filtrate through a heavy metals filter having at least one filter element comprising metal particles bound together in an interconnected form of a porous metal sponge-like structure to provide a treated machine coolant having a controlled pH which is substantially free of tramp oil, particulate matter and dissolved heavy metals and which is resistant to bacterial growth.

38. The method of claim 37 wherein, in the step of providing the suction skimmer, the suction skimmer further comprises:

throttle means supported by the body member for varying the length of the slot so as to provide substantially laminar flow of the coolant and tramp oil through the slot and into the fluid flow passageway of the body member.

39. The method of claim 38 wherein, in the step of providing the suction skimmer, the throttle means comprises:

a sleeve member disposed on the body member so as to be slidably movable thereon for varying the length of the slot.

40. The method of claim 38 wherein, in the step of providing the suction skimmer, the body member is an elongated body member having a peripheral surface and wherein the throttle means comprises;

a sleeve member disposed about the peripheral surface of the elongated member the body member so as to be slidably movable thereon for varying the length of the slot, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slot in the elongated body member.

41. The method of claim 37 wherein, in the step of providing the suction skimmer, the body member is an elongated body member having a peripheral surface and a plurality of spatially disposed elongated slots extending from the first end of the elongated body member and terminating a distance from the second end thereof, and wherein the elongated body member further comprises means for connecting the second end of the elongated body member to the outlet of the reservoir so that a fluid-tight connection is formed therebetween and the first end of the elongated body member and a portion of the slots are disposed a distance above the machine coolant in the reservoir.

42. The method of claim 41 wherein, in the step of providing the suction skimmer, the suction skimmer further comprises:
  throttle means supported by the elongated body member for varying the length of the slots and thereby maintaining substantially laminar flow of the coolant and tramp oil into the fluid flow passageway of the body member.

43. The method of claim 42 wherein, in the step of providing the suction skimmer, the throttle means comprises:
  a sleeve member disposed on the elongated body member so as to be slidably movable thereon for varying the length of the slots.

44. The method of claim 42 wherein, in the step of providing the suction skimmer, the elongated body member is provided with a substantially circular shaped cross section and wherein the throttle means comprises;
  a sleeve member disposed about the peripheral surface of the elongated body member so as to be slidably movable thereon for varying the length of the slots, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slots in the elongated body member.

45. The method of claim 37 wherein, in the step of providing the suction skimmer, the body member is a cylindrically shaped elongated body member having an elongated axis extending from the first end to the second end and an outer peripheral surface, and wherein a plurality of the slots are spatially disposed in the body member, each of the slots being disposed substantially parallel to the elongated axis of the cylindrically shaped elongated member and extending from the first end of the body member and terminating a distance from the second end thereof, and wherein the suction skimmer further comprises:
  throttle means supported by the cylindrically shaped elongated body member for varying the length of the slots and thereby controlling the flow rate of coolant through the fluid flow passageway of the cylindrically shaped elongated body member so as to provide substantially laminar flow of the coolant through the slots and into the fluid flow passageway.

46. The method of claim 45 wherein, in the step of providing the suction skimmer, the throttle means comprises:
  a sleeve member disposed on the peripheral surface of the cylindrical shaped elongated body member so as to be slidably movable thereon for varying the length of the slots.

47. The method of claim 46 wherein, in the step of providing the suction skimmer, the sleeve member is provided with an upper sleeve portion and a lower sleeve portion, the upper sleeve portion having a first end and a second end, the upper sleeve portion disposed a distance from the peripheral surface of the cylindrically shaped elongated body member so that the upper sleeve portion cooperates with an adjacently disposed portion of the peripheral surface of the cylindrically shaped elongated body member to form an annulus therebetween, the lower sleeve portion having a first end and a second end, the first end of the lower sleeve portion connected to the second end of the upper sleeve portion so as to define a closed lower end of the annulus, the lower sleeve portion disposed about the peripheral surface of the cylindrically shaped elongated body member and frictionally engaging the cylindrically shaped elongated body member so that the sleeve member can be disposed in a desired position on the cylindrically shaped elongated body member while permitting the sleeve member to be slidably moved along the peripheral surface of the cylindrically shaped elongated body member to vary the length of the slots in the cylindrically shaped elongated body member.

48. The method of claim 37 wherein the oil absorbent media is a block polymer capable of locking up free oil and a cellulose absorbent.

49. The method of claim 48 wherein the particle filter is a polypropylene particle filter.

50. The method of claim 49 wherein the polypropylene particle filter has an average pore size of about 5 microns.

51. The method of claim 37 wherein the particle filter is a polypropylene particle filter.

52. The method of claim 51 wherein the polypropylene particle filter has an average pore size of about 5 microns.

53. The method of claim 37 further comprising:

varying the length of the slot in the body member so to provide laminar flow of coolant into the slot for passage through the fluid flow passageway of the body member.

54. A method for removing heart metal contaminants from a machine coolant while controlling the pH of the machine coolant and the bacterial growth in the machine coolant without addition of chemical additives comprising:

passing the machine coolant through a porous metal sponge-like structure consisting essentially of metal particles bound together in an interconnected form wherein the metal particles are selected from the group consisting of zinc copper and mixtures thereof.

* * * * *

UNITED STATES PATENT AND TRADEMARK OFFICE
CERTIFICATE OF CORRECTION

PATENT NO. : 5,599,457
DATED : February 4, 1997
INVENTOR(S) : Fanning et al.

It is certified that error appears in the above-identified patent and that said Letters Patent is hereby corrected as shown below:

Cover page, U.S. PATENT DOCUMENTS, after line 4, please insert --4,642,192  2/87  Heskett  210/638--.

Cover page, U.S. PATENT DOCUMENTS, after line 6, please insert --5,122,274  6/92  Heskett  210/638--.

Cover page, U.S. PATENT DOCUMENTS, after line 7, please insert --5,135,654  8/92  Heskett  210/638--.

Signed and Sealed this

Twenty-ninth Day of August, 2000

*Attest:*

Q. TODD DICKINSON

*Attesting Officer*   *Director of Patents and Trademarks*